F. McKINNEY.
BALING PRESS.
APPLICATION FILED MAR. 30, 1908.

No. 906,265.

Patented Dec. 8, 1908.

2 SHEETS—SHEET 2.

Witnesses
Alex Currie
Charles A. Infield

Inventor
Finch McKinney
by Geo. H. Strong
Attorney

UNITED STATES PATENT OFFICE.

FINCH McKINNEY, OF FRUITVALE, CALIFORNIA.

BALING-PRESS.

No. 906,265.  Specification of Letters Patent.  Patented Dec. 8, 1908.

Application filed March 30, 1908. Serial No. 424,240.

*To all whom it may concern:*

Be it known that I, FINCH MCKINNEY, citizen of the United States, residing at Fruitvale, in the county of Alameda and State of California, have invented new and useful Improvements in Baling-Presses, of which the following is a specification.

My invention relates to improvements in baling-presses of that class in which the material to be compressed is forced in successive charges into the end of a tube, having a shape like that of the desired bale, and in forcing the material through said tube, the friction in which causes a sufficient compression of the bale which may be tied before being ejected from the outer end of the tube.

My invention comprises combinations of parts and details of construction which will be more fully explained by reference to the accompanying drawings, in which—

Figure 1:
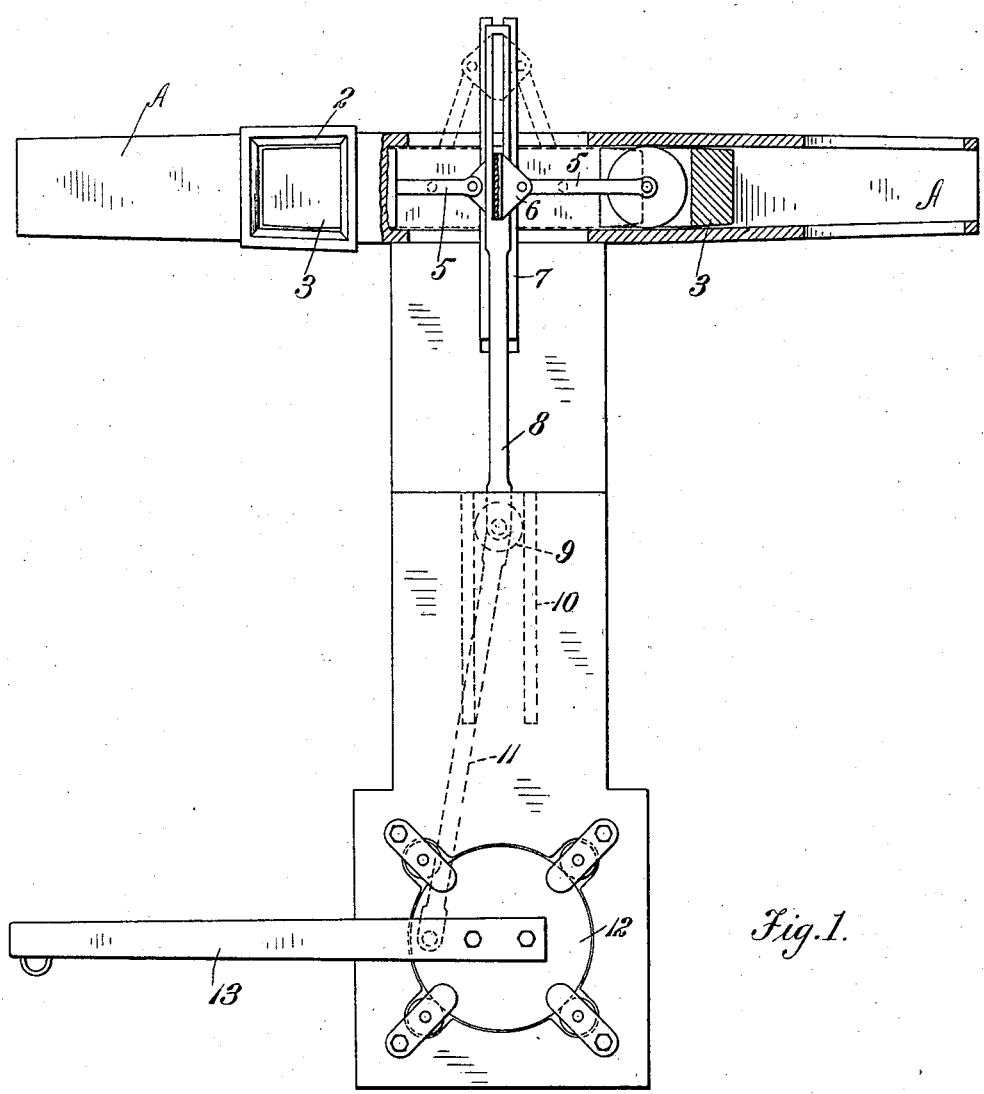
Figure 2:
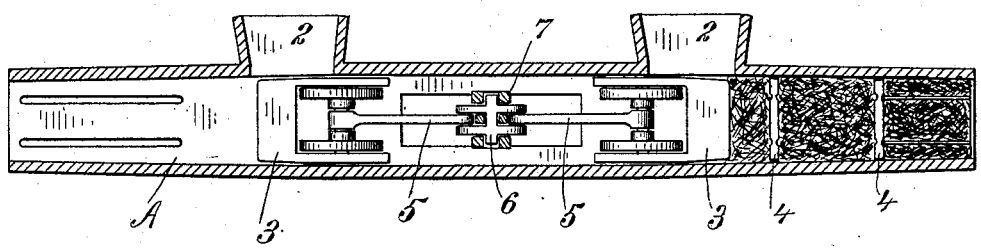
Figure 3:
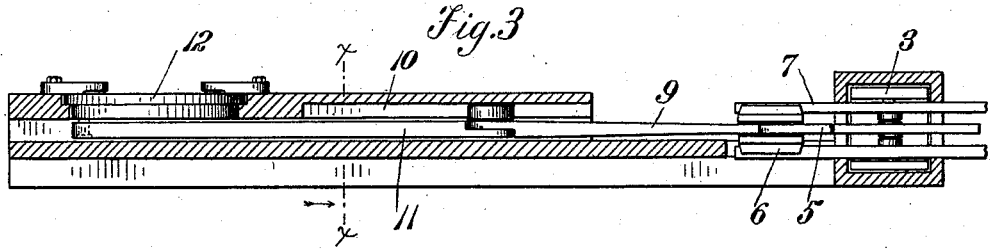
Figure 4:
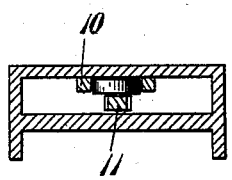
Figure 5:

Figure 1 is a plan view partly in section of the invention. Fig. 2 is a longitudinal sectional view of the baling chambers. Fig. 3 is a longitudinal sectional view showing the plunger-operating means. Fig. 4 is a transverse sectional view taken on line x—x of Fig. 3. Fig. 5 is a detail sectional view showing the anti-frictional bearing for the driving disk.

A, A are two baling chambers having a transverse section like that which it is desired to give the bale.

2 are hoppers or feed openings through which the material to be compressed is fed into the chambers.

3 are plungers or followers adapted to move outwardly and compress the charges of material successively.

The interior of the baling chambers are preferably contracted from the receiving to the discharge end, and thus provide a sufficient friction to allow the successive charges to be compressed into a compact bale before reaching the outer end of the tube. When a sufficient amount of material has been compressed in either of the chambers, a board or follower 4 may be placed against this charge, and another bale commenced by compressing material against this board, the first one being meantime gradually forced outward. Suitable transverse channels may be made in the faces of these boards 4 so that with a rod, the binding cord or wire may be introduced and passed around the bale, being fastened so that when the bale finally reaches the end of the chamber and is discharged, it is retained in its compressed form. The plungers or followers 3 are actuated by thrust bars 5. These bars each have one end pivoted to one of the followers; the apparatus being here represented as double, and the followers located in the inner ends of the baling chambers, and capable of being withdrawn so far as to allow material to be fed into the outer part of the chamber beyond the follower ends, through the feed openings 2. The opposite ends of the thrust bars 5 are connected with a cross-head 6 which is slidable between guides 7. These guides extend transversely across the baling chamber structure, and intermediate between the followers, and it will be seen that when the followers are nearest together, the thrust bars 5 will stand at an angle diverging from the cross-head to their points of connection with the followers.

When the cross-head is moved so as to pass across the intervening space between the followers, these thrust bars 5 force the followers outwardly with a gradually increasing power until the bars are substantially in line with each other and the cross-head between the followers. Then as the cross-head passes on to the opposite end of its travel, the followers 3 will move back to their central position to again expose the feed openings, and the bars 5 will, by their connection with the cross-head assume a diagonal position opposite to the one previously occupied. This movement of the cross-head after passing the center is effected by the elasticity of the material being compressed, which acts like a spring through the followers, and rapidly forces the cross-head to the opposite ends of its travel each time after it has passed the center.

The compression movement in which the cross-head is moved from its farthest position to a point centrally between the two followers, is effected by means of a crank propelled connecting rod 8, one end of which is slotted, and the cross-head 6 is so constructed that the central portion is slidable in the slot of this connecting rod. The opposite end of the connecting rod engages with a cross-head 9 which is slidable in guides 10, and this cross-head is connected by a pitman 11 with a crank pin upon a horizontally turnable disk 12. This disk is turnable within a properly constructed anti-frictional bearing which may be either formed of rollers or balls. In either case, the upper bearing portion is such as to prevent the tilting of the disk 12, when pressure is brought upon it in the act of moving the pitman 11 and connected parts. This disk 12 may be driven in various ways. In the present arrangement I have shown a sweep 13 fixed to the disk, and to this sweep a team of horses may be connected, and being driven around in a circle, the crank will actuate the pitman and through it the rod 8, the thrust bars 5 and the followers.

The team by which the device is operated is obliged to cross the rod 8, and I have therefore connected this rod with cross-heads at each end so that it always moves in a straight line, whereas if the pitman extended from the crank to the cross-head 6, there would be a certain amount of swing from one side to the other which would tend to cause the pitman to strike the legs of the horses while crossing, and cause them to become timid, and this movement would be very rapid at the time when the cross-head moves from the center to the end of its stroke. For this reason, the extension of the rod 8 and slotting it so that the cross-head may slide from one end to the other of the slot, allows for the rapid movement without any change in the position of the rod 8. The slot is long enough so that when the rod starts to move in either direction, it engages with the cross-head 6 and draws it to the center between the followers by means of the power applied. Then after passing the center, the elasticity of the material, as before described, causes the cross-head to move rapidly to the opposite end of the slot, and in position to be again returned as the reciprocation of the rod 8 takes place.

Having thus described my invention, what I claim and desire to secure by Letters Patent is—

1. In a baling-press of the character described, baling chambers in line, feed openings on the top, followers movable outwardly in said chambers to compress the charges, transversely fixed guides between the followers, a cross-head slidable in said guides, connections between the cross-head and the followers, a bar having a slot through which the cross-head is slidable, a second set of guides at a distance from and at right angles to the press-box, a cross-head upon said guides with which the opposite end of the slotted rod connects, and a pitman connecting said cross-head with a revoluble crank.

2. In a baling-press of the character described, press-boxes in line with each other, followers movable therein, guides fixed transversely between the followers, a cross head operable between said guides, a second pair of guides in line with and distant from the first named guides, a cross head operable between the second-named guides, a bar having one end connected with the second cross-head, the other end slotted to allow the first named cross-head to slide in the slot, connections between said cross-head and the followers, a revoluble disk having a crank pin, and a pitman connecting the disk with the second cross-head, and means for revolving the disk.

In testimony whereof I have hereunto set my hand in presence of two subscribing witnesses.

FINCH McKINNEY.

Witnesses:
J. C. GILSON,
S. C. ARCHIBALD.